US011926490B2

(12) United States Patent
Anatrini

(10) Patent No.: US 11,926,490 B2
(45) Date of Patent: Mar. 12, 2024

(54) APPARATUS FOR EXTRACTING PHARMACEUTICAL CONTAINERS BEING BOTTLES, FROM RELATIVE SUPPORT ELEMENTS CONSTITUTED BY A TRAY

(71) Applicant: MARCHESINI GROUP S.P.A., Pianoro (IT)

(72) Inventor: Dario Anatrini, Siena (IT)

(73) Assignee: Marchesini Group S.P.A. (IT)

( * ) Notice: Subject to any disclaimer, the term of this patent is extended or adjusted under 35 U.S.C. 154(b) by 667 days.

(21) Appl. No.: 17/252,135

(22) PCT Filed: Jun. 7, 2019

(86) PCT No.: PCT/IB2019/054755
§ 371 (c)(1),
(2) Date: Dec. 14, 2020

(87) PCT Pub. No.: WO2019/243941
PCT Pub. Date: Dec. 26, 2019

(65) Prior Publication Data
US 2021/0253367 A1      Aug. 19, 2021

(30) Foreign Application Priority Data
Jun. 20, 2018   (IT) .................. 102018000006485

(51) Int. Cl.
*B65B 43/46*      (2006.01)
*B65B 3/00*       (2006.01)
*B65B 55/02*      (2006.01)
*B65G 47/91*      (2006.01)
*B65B 31/02*      (2006.01)

(52) U.S. Cl.
CPC .............. *B65G 47/91* (2013.01); *B65B 3/003* (2013.01); *B65B 43/46* (2013.01); *B65B 55/027* (2013.01);
(Continued)

(58) Field of Classification Search
CPC ......... B65B 3/003; B65B 21/12; B65B 21/14; B65B 21/18; B65B 31/025; B65B 43/42;
(Continued)

(56) References Cited

U.S. PATENT DOCUMENTS

| 2,749,688 A * | 6/1956 | Cozzoli ................... B65B 3/003 53/77 |
| 4,911,602 A * | 3/1990 | Abe ........................ B65B 21/14 198/409 |

(Continued)

FOREIGN PATENT DOCUMENTS

| CN | 202219980 U | * | 5/2012 | |
| CN | 107867433 A | * | 4/2018 | ............. B65B 43/46 |

(Continued)

*Primary Examiner* — Stephen F. Gerrity
(74) *Attorney, Agent, or Firm* — Endurance Law Group PLC

(57) ABSTRACT

Apparatus extracting, from trays, bottles with mouths facing downwards includes an advancement line stopping the trays at a rest station; a handling organ; and a bottle pickup and transfer mechanism having a suction plate, with suction seats receiving and retaining the bottles internally. A frame with a housing receives and releasably retains the suction plate. The frame rotates about a first axis to a first operating position near the rest station and to a second operating position near the handling organ. Grippers and moving mechanisms pick up and move the suction plate above the tray with the seated bottles, raise the plate with the bottles, and then position the plate at the housing in the first operating position.

14 Claims, 15 Drawing Sheets

(52) U.S. Cl.
CPC ......... *B65G 47/914* (2013.01); *B65G 47/915* (2013.01); *B65B 31/025* (2013.01); *B65G 2201/0244* (2013.01)

(58) Field of Classification Search
CPC ....... B65B 43/46; B65B 55/027; B65G 47/06; B65G 47/91; B65G 47/914; B65G 47/915; B65G 2201/0244
USPC .................................. 53/539, 247, 250, 251
See application file for complete search history.

(56) References Cited

U.S. PATENT DOCUMENTS

| | | | | |
|---|---|---|---|---|
| 5,471,738 | A * | 12/1995 | Burcham et al. .... | B25J 15/0052 294/94 |
| 6,733,224 | B1 * | 5/2004 | Linner ................... | B65B 43/46 294/93 |
| 8,423,174 | B2 * | 4/2013 | Koch et al. ............. | G06F 17/00 700/214 |
| 2015/0266602 | A1 * | 9/2015 | Franceschi et al. .... | B65B 43/46 414/222.01 |
| 2018/0134423 | A1 | 5/2018 | Narvekar et al. | |

FOREIGN PATENT DOCUMENTS

| | | | |
|---|---|---|---|
| CN | 207389611 U | * | 5/2018 |
| DE | 9218611 U1 | | 11/1994 |
| DE | 19513552 A1 | | 10/1996 |
| WO | WO2016/198391 A1 | | 12/2016 |
| WO | WO2018/011748 A1 | | 1/2018 |

* cited by examiner

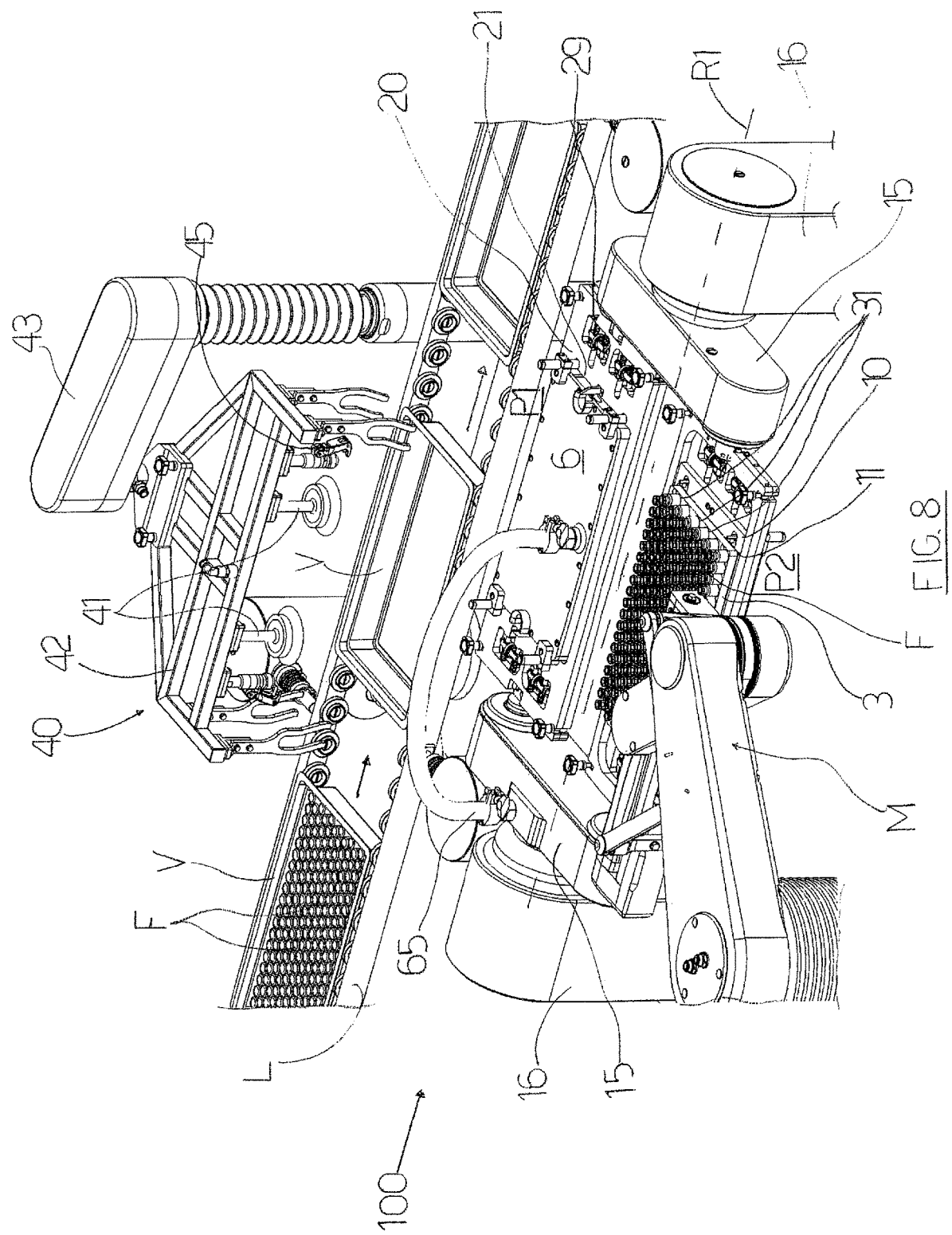

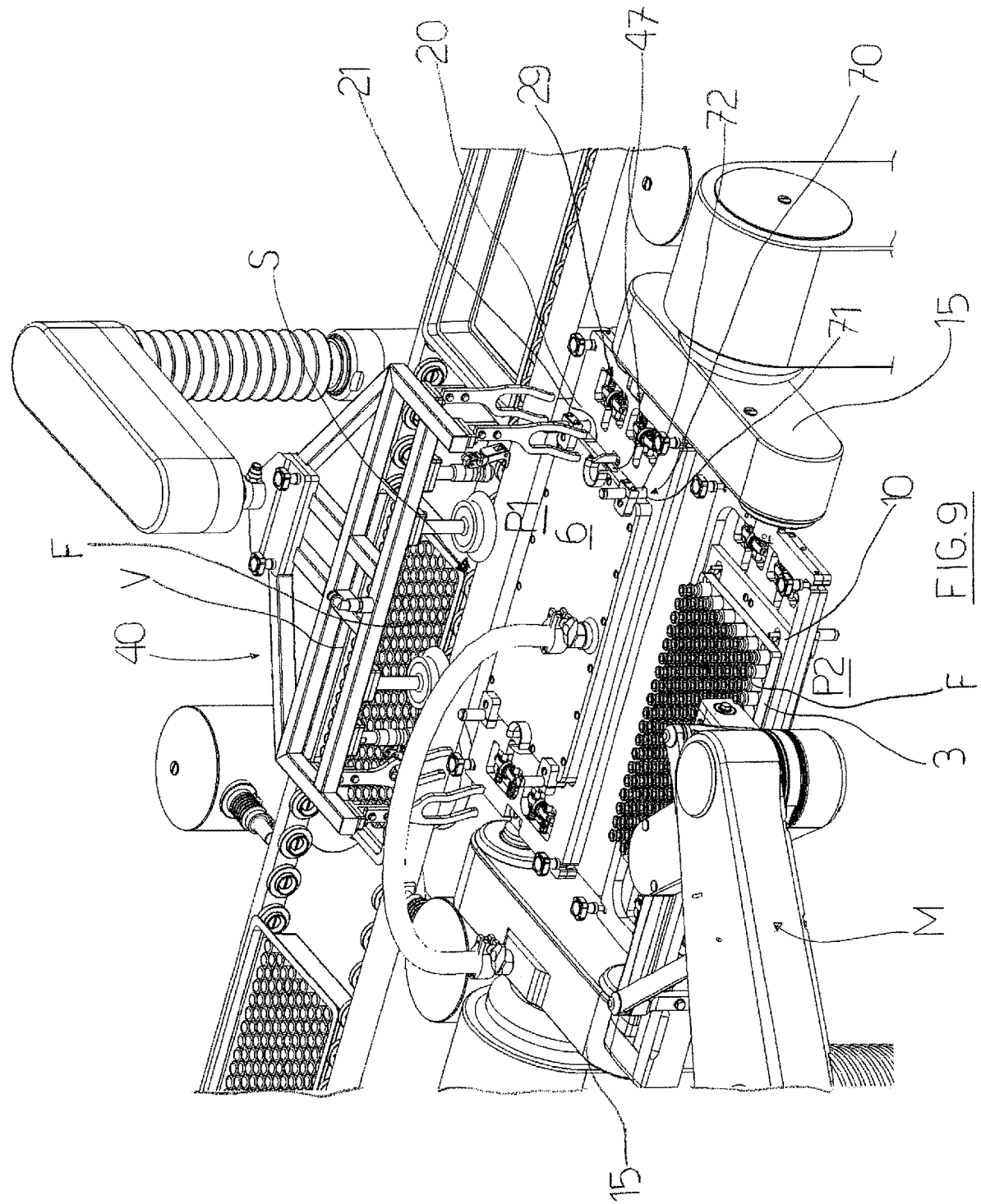

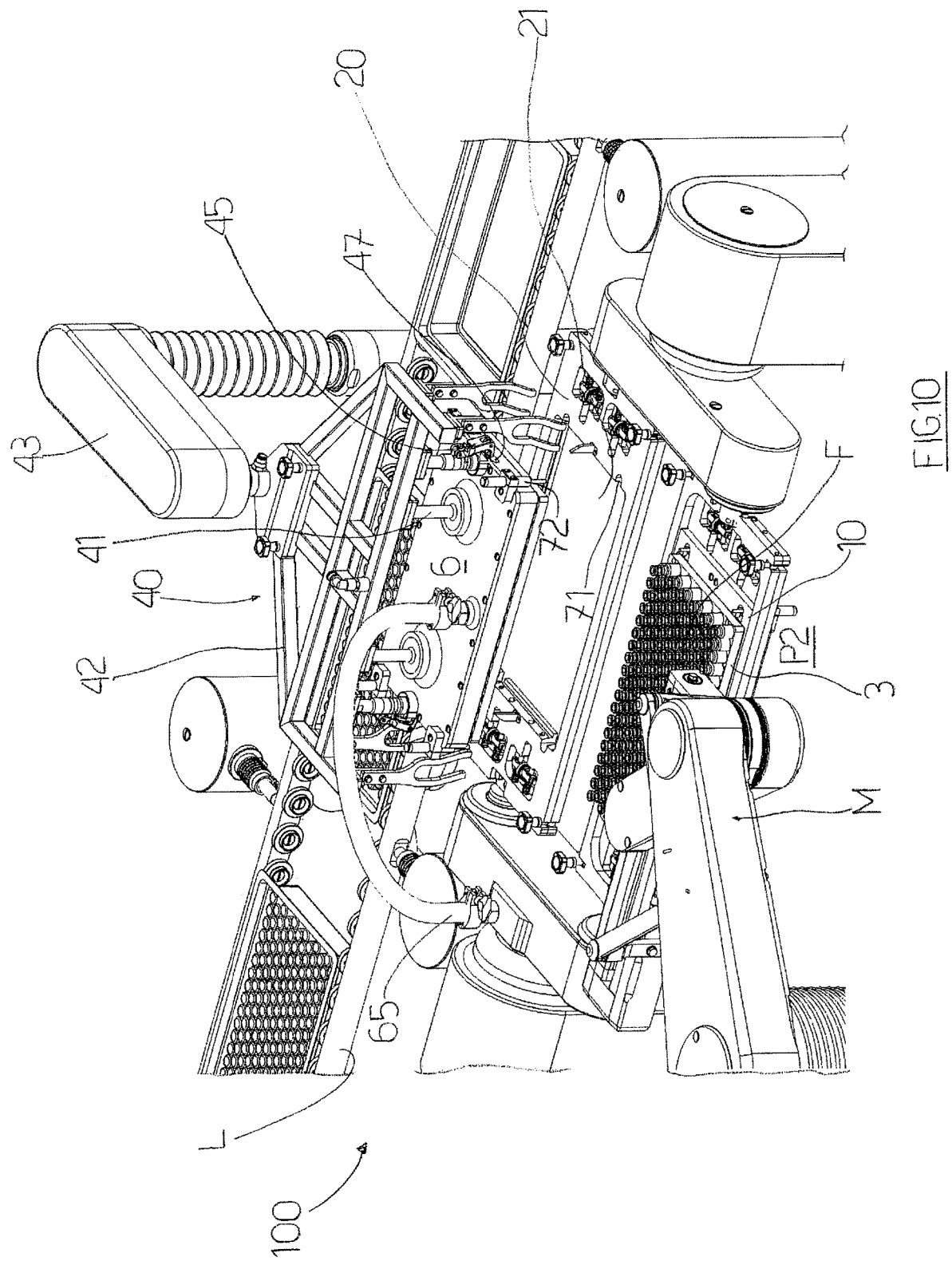

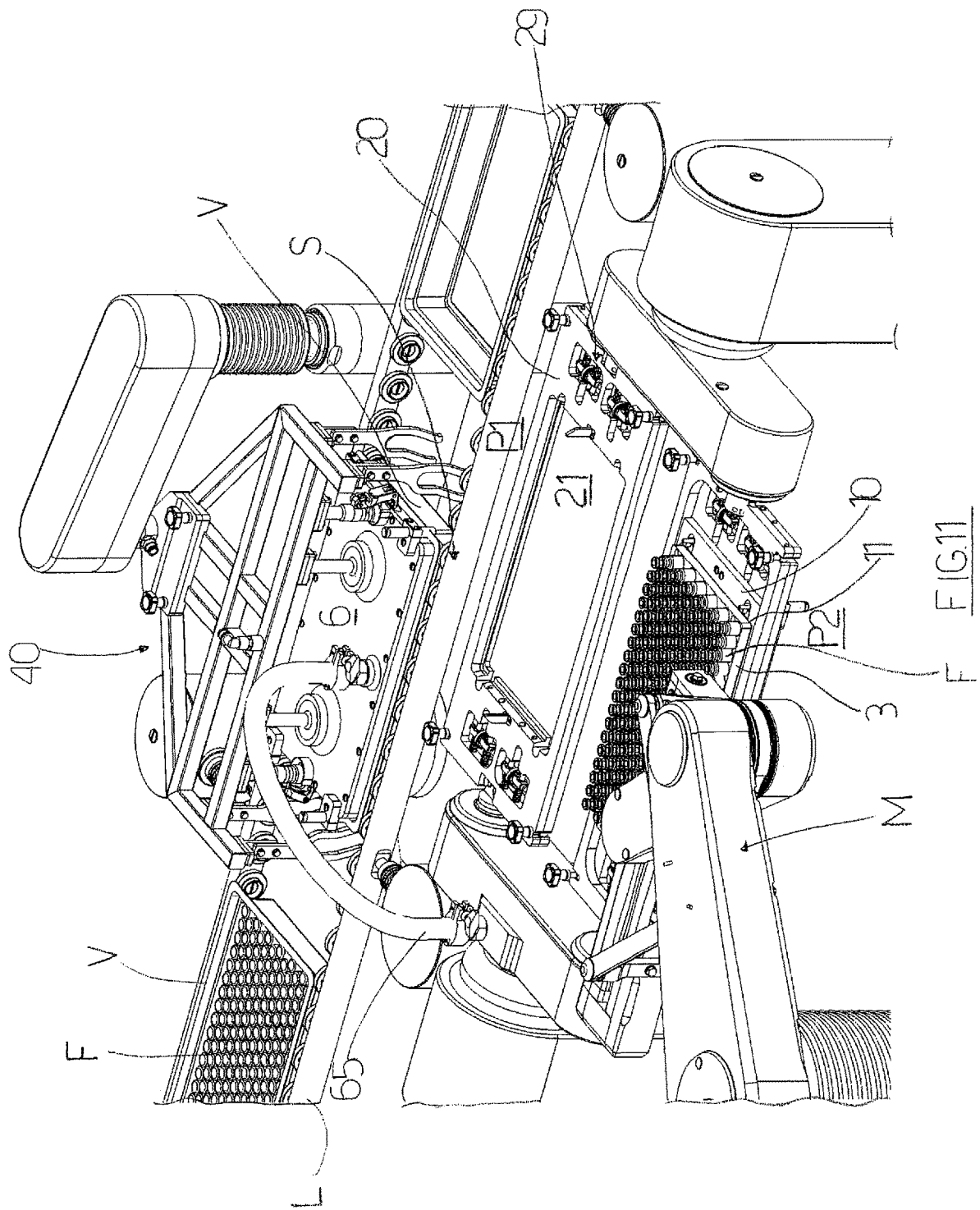

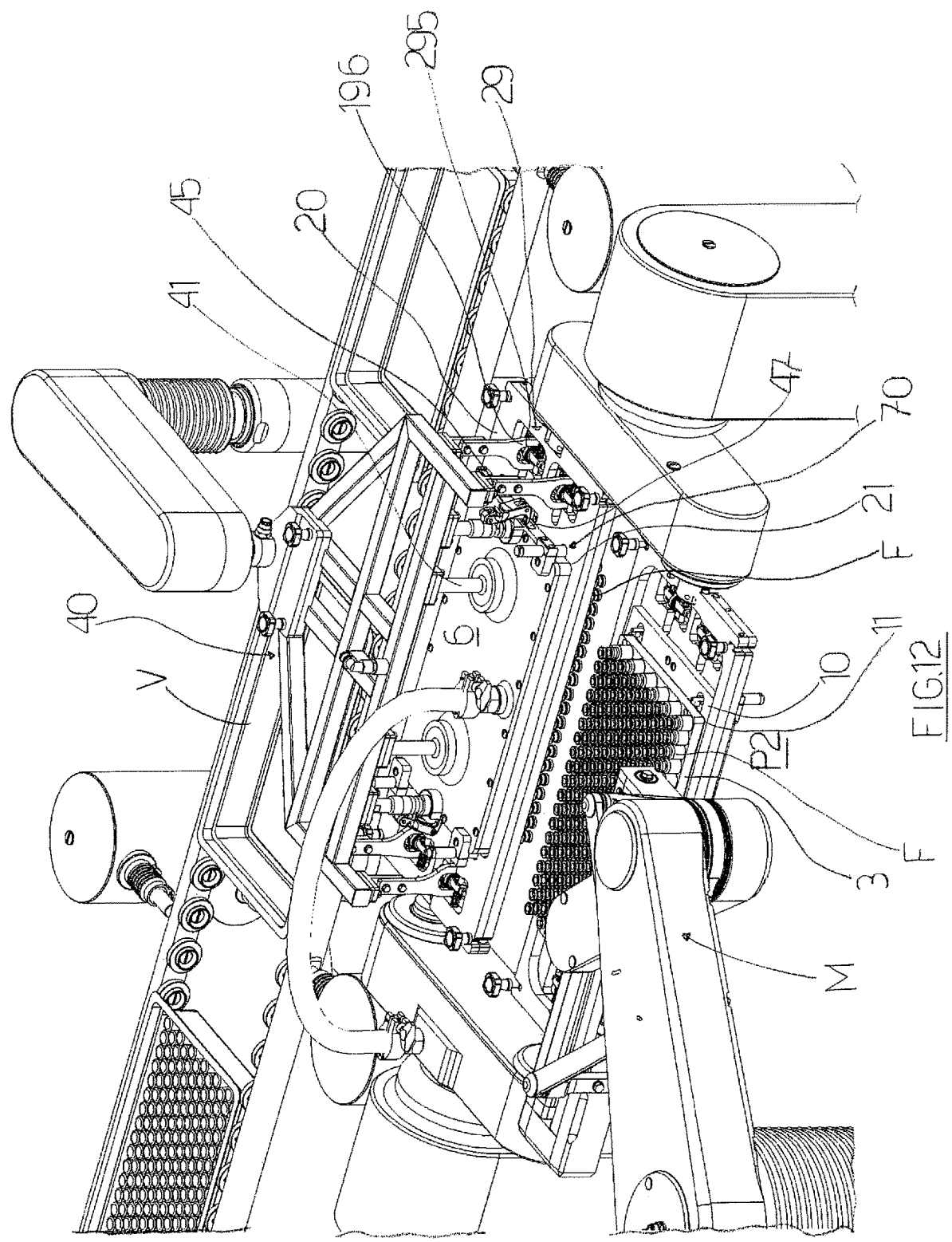

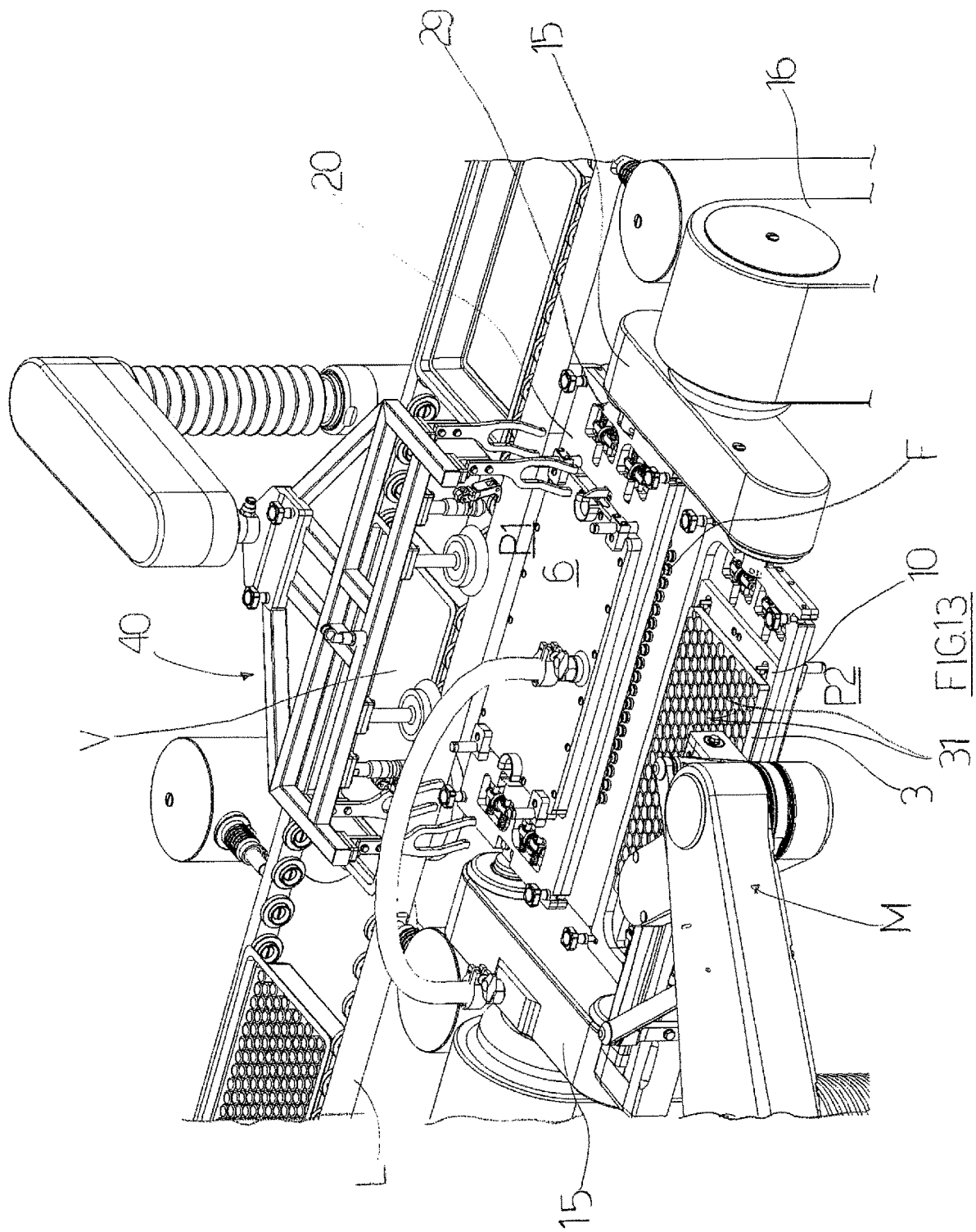

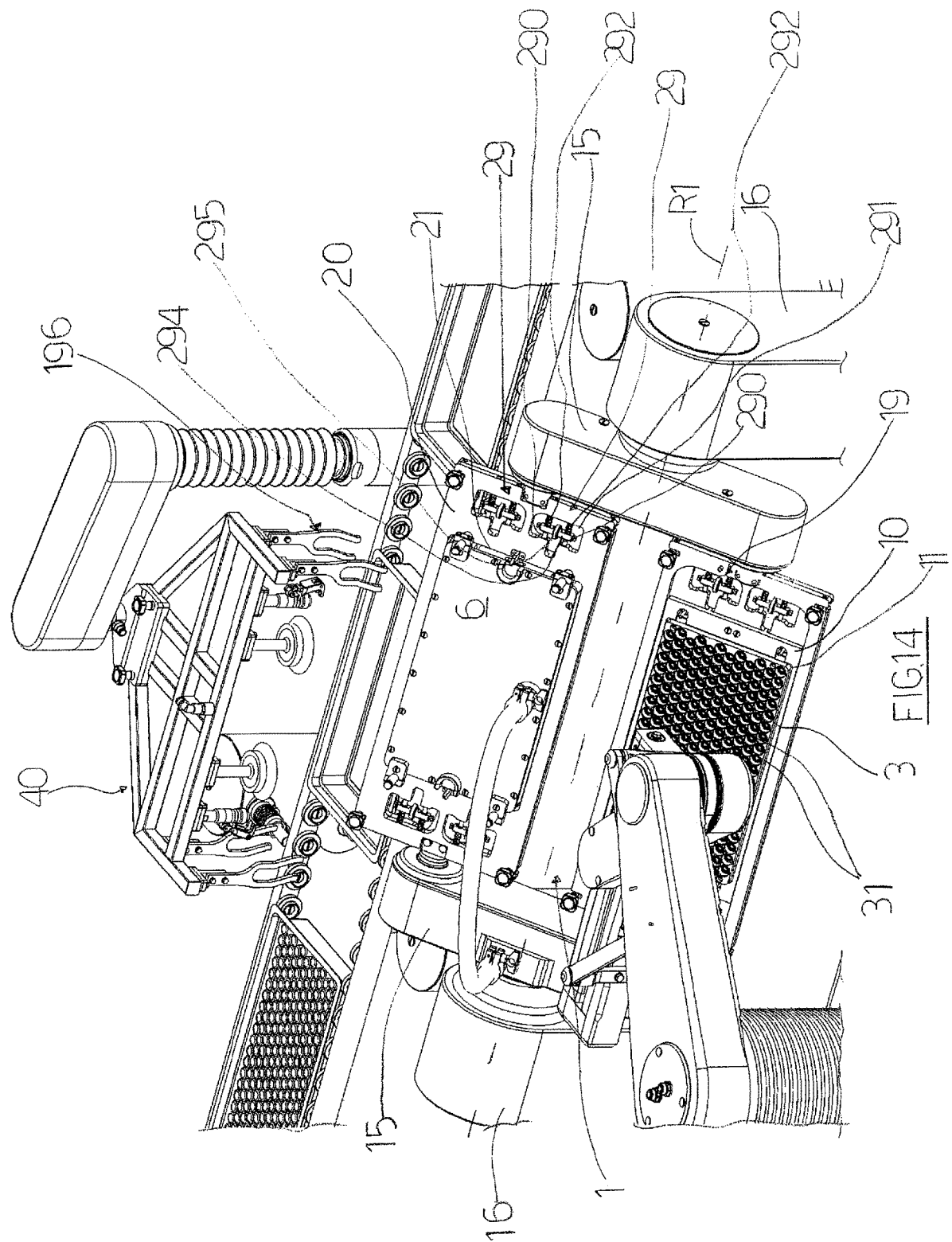

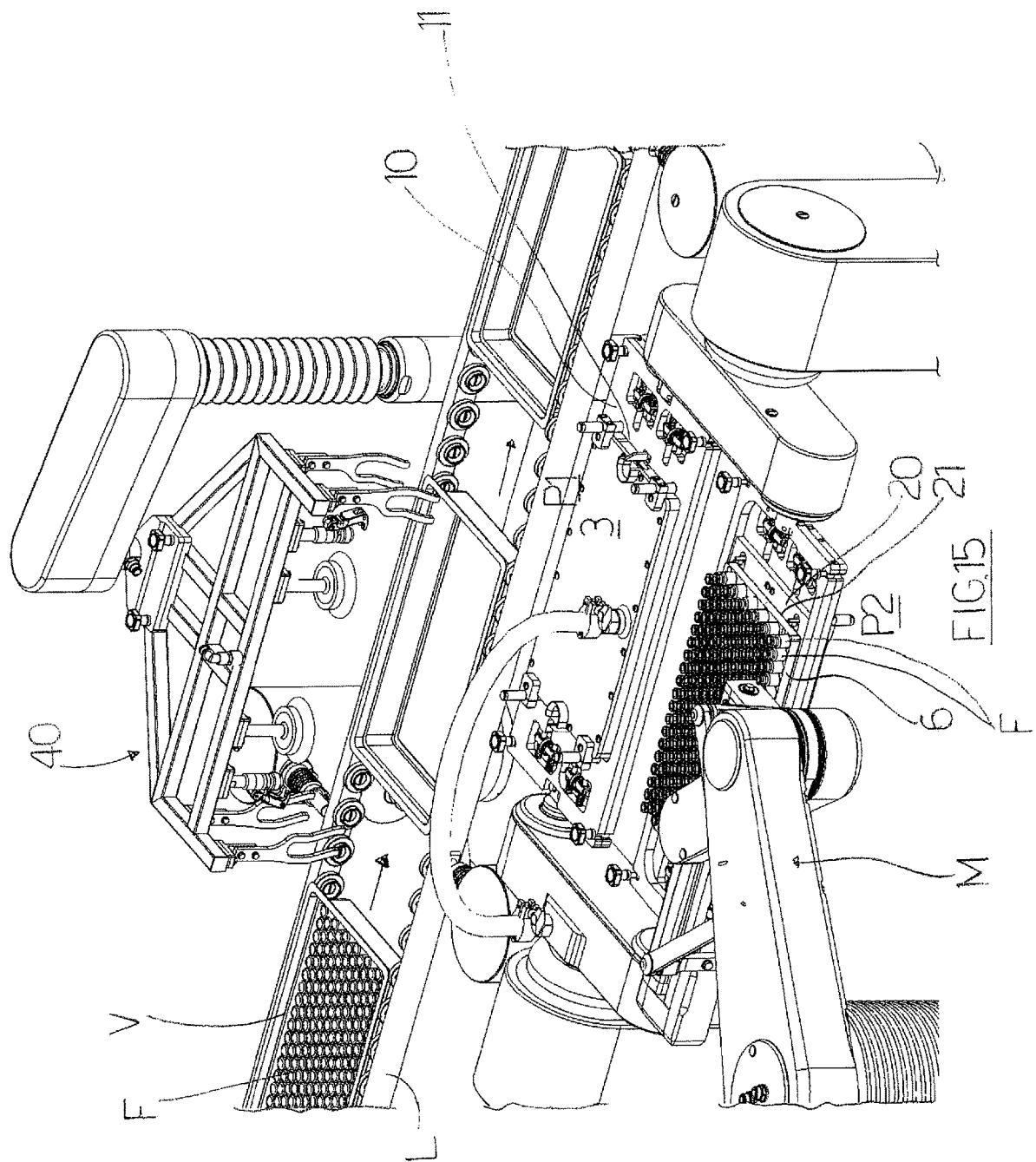

APPARATUS FOR EXTRACTING PHARMACEUTICAL CONTAINERS BEING BOTTLES, FROM RELATIVE SUPPORT ELEMENTS CONSTITUTED BY A TRAY

FIELD OF THE INVENTION

The present invention relates to the special technical sector concerning the packing of pharmaceutical substances or products in relative containers, being bottles.

DESCRIPTION OF THE PRIOR ART

It is known that pharmaceutical containers, such as bottles, which are to be filled, are usually predisposed in groups of rows and inserted in relative support elements which are then packed inside sterile packages.

The sterile packages are then supplied to pharmaceutical producers who utilise machines for carrying out the filling of the containers with the pharmaceutical substances or products and the subsequent closure thereof.

The present invention concerns in particular an apparatus for extracting pharmaceutical containers being bottles, from relative support elements constituted by a tray.

In the case of pharmaceutical containers to be filled that are constituted by bottles, the bottles are predisposed one flanked to another in several rows flanked inside the relative trays, with the relative mouths for inserting the pharmaceutical substance or product facing towards the bottom of the tray.

The trays, with the bottles arranged inside them as described, are then covered with a protective film and then packed in sterile conditions, inside one or more casings.

These packing modalities are necessary to conserve the integrity of the bottles, to prevent any possible contamination by external agents.

The pharmaceutical producers receives these types of sterile packages, with the bottles thus-predisposed in the trays and, therefore, have to proceed to opening the packs, by opening the casings and removing the sealing film.

Thereafter the extraction operations of the bottles from the trays and the transfer thereof to special work stations for carrying out the filling and sealing thereof have to be carried out in sterile conditions.

The extraction operations of the bottles from the relative trays, and the subsequent transfer thereof to the filling station, must be carried out with particular care and caution, and with non-invasive modalities so as to avoid, or at least avoid as far as possible, any situations or movements of the bottles which can expose them to causes of contamination.

Further, in the specific case, the bottles, once extracted from the trays, and before being transferred to the filling station, must also be tilted so that they are arranged with the relative mouths facing upwards.

This particular operation is difficult to carry out as it must be done without exposing the bottles to possible causes of contamination.

SUMMARY OF THE INVENTION

The aim of the present invention is to describe an apparatus for extracting pharmaceutical containers being bottles, from relative support elements constituted by trays, in which the bottles are arranged with the relative mouth facing towards the bottom of the trays, able to carry out the operations of extraction, and the tilting of the bottles so as to arrange them with the mouths facing upwards, in a rapid and efficient way, without the bottles being exposed to any risk or at least only a minimum risk, of any contaminations.

The above aim is obtained by an apparatus for extracting pharmaceutical containers, namely, bottles, from respective support elements constituted by trays.

BRIEF DESCRIPTION OF THE DRAWINGS

The characteristics of a preferred, but not exclusive, embodiment of the apparatus for extracting pharmaceutical containers, being bottles, from relative support elements constituted by a tray, in which the bottles are arranged with the mouths thereof facing downwards to the bottom of the tray, of the present invention will be described in the following with reference to the appended tables of drawings, in which.

Figure 1:
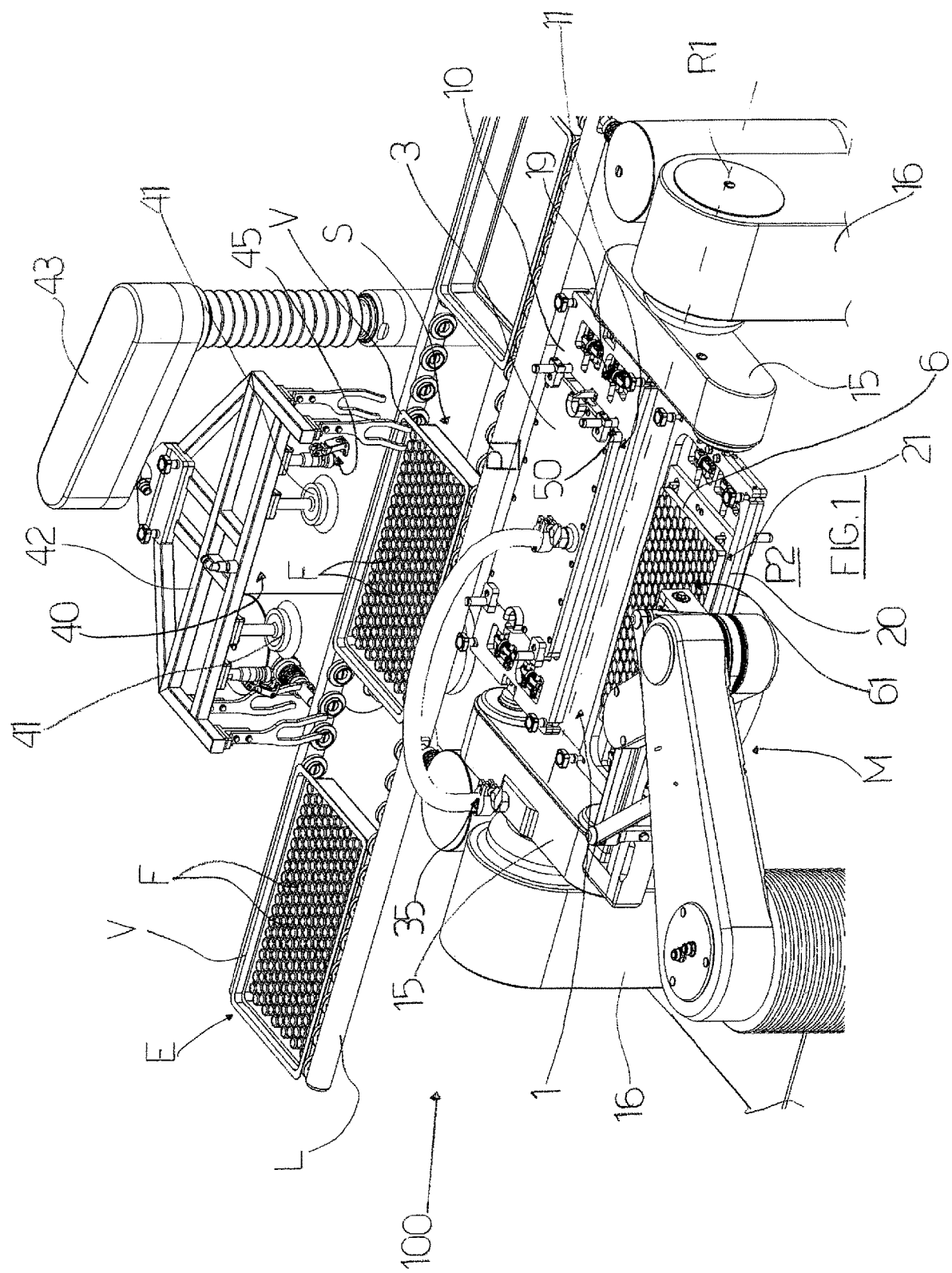
FIG. 1 is a schematic perspective view of the apparatus of the invention for extracting pharmaceutical containers, being bottles, which are arranged in relative trays with the mouths thereof facing towards the bottom of the trays, in a non-operative position.

FIGS. from 2 to 15 illustrate, in schematic perspective views, a possible succession of operating steps of the apparatus of the invention, for extracting the bottles from the relative trays and for tilting the bottles and arranging the bottles with the relative mouths facing upwards, before transfer thereof to a filling station (not illustrated in the figures as not an object of the invention).

DESCRIPTION OF THE PREFERRED EMBODIMENTS

With reference to the accompanying tables of drawings, reference numeral (100) denotes the apparatus for extracting pharmaceutical containers to be filled, being bottles (F), from relative support elements (E) constituted by a tray (V), object of the present invention, in its entirety.

The apparatus (100) is designed to carry out the extraction of the pharmaceutical containers to be filled, being bottles (F), which are arranged in the tray (V) with the relative mouths for insertion of a pharmaceutical substance or product facing towards the bottom of the tray (V).

Therefore, with this type of support elements (E) constituted by trays (V), and with this arrangement of the bottles (F) with the relative mouths facing towards the bottom of the trays (V), the extraction operations must be carried out by handling the bottles in such a way as to be able to tilt them in order to arrange them with the relative mouths upwards, so as to enable an easy transfer thereof to the filling and closing stations.

These operations, including the tiling of the bottles, must therefore be carried out in such a way as to expose the bottles to the lowest possible number of causes of contamination and, preferably, to no possible cause of contamination.

The apparatus (100) of the present invention comprises: an advancement line (L), for advancing the trays (V), with the bottles (F) inside, and for stopping the trays at a rest station (S); a handling organ (M), and a pickup and transfer station (1), for picking up the bottles (F) from the tray (V) positioned by the advancement line (L) in the rest station (S).

In particular, the pickup and transfer station (1) comprises at least a suction plate (3), which is provided on a relative face of a plurality of seats (31), each of the seats (31) being conformed so as to be able to house internally thereof the bottom and a portion of the body of a bottle (F) (see for example FIGS. 13 and 14 in which the seats (31) present in the suction plate (3) are visible in detail).

In greater detail, the plurality of seats (31) is predisposed on the face of the second suction plate (3) in an arrangement corresponding to the arrangement of the bottles (F) present in the trays (V), and each of the seats (31) is predisposed and configured to be connected to a suction source (35), so as to exert a suction action.

The pick up and transfer station (1) further comprises at least a frame (10) conformed in such a way as to have a through-housing (11) having a shape and dimensions such as to be able to receive the second suction plate (3), by form coupling.

The frame (10) is predisposed in such a way as to be activatable in rotation about a first rotation axis (R1) in order to be positionable in a first operating position (P1), in proximity of the rest station (S) of the advancement line (L) (see FIGS. from 1 to 6 and FIG. 15), and in a second operating position (P2) in proximity of the handling organ (M) (see FIGS. from 7 to 14).

Further, the pick up and transfer station (1) comprises gripping and moving means (40) for gripping and moving the suction plate (3), which are configured and predisposed to pick up and move the suction plate (3).

In detail, when a tray (V) is positioned in the rest station (S) of the advancement line (L) and the frame (10) is positioned in the first operating position (P1) (see the sequence illustrated in FIGS. from 1 to 6), the gripping and moving means (40) are activatable to pick up and move the suction plate (3) so as to position the suction plate (3) above the tray (V) and lower the suction plate (3) towards the tray (V) so that the bottles (F) present therein are housed in the seats (31) of the suction plate (3), in such a way that the bottles (F) are retained by suction in the seats (31), and then to raise the suction plate (3), with the bottles (F) retained by suction in the bottles (31) and position the suction plate (3) at the through-housing (11) of the frame (10) so that the bottles (F), retained by suction in the seats (31), are turned with the mouths thereof facing downwards (see the sequence illustrated in FIGS. from 1 to 6).

Releasable coupling means (19) are also present, and are configured and predisposed to releasably retain the suction plate (3) once positioned in the housing (11).

The pick up and transfer station (1) is further configured to be able to have the following peculiarity in relation to the frame (10).

Figure 5:
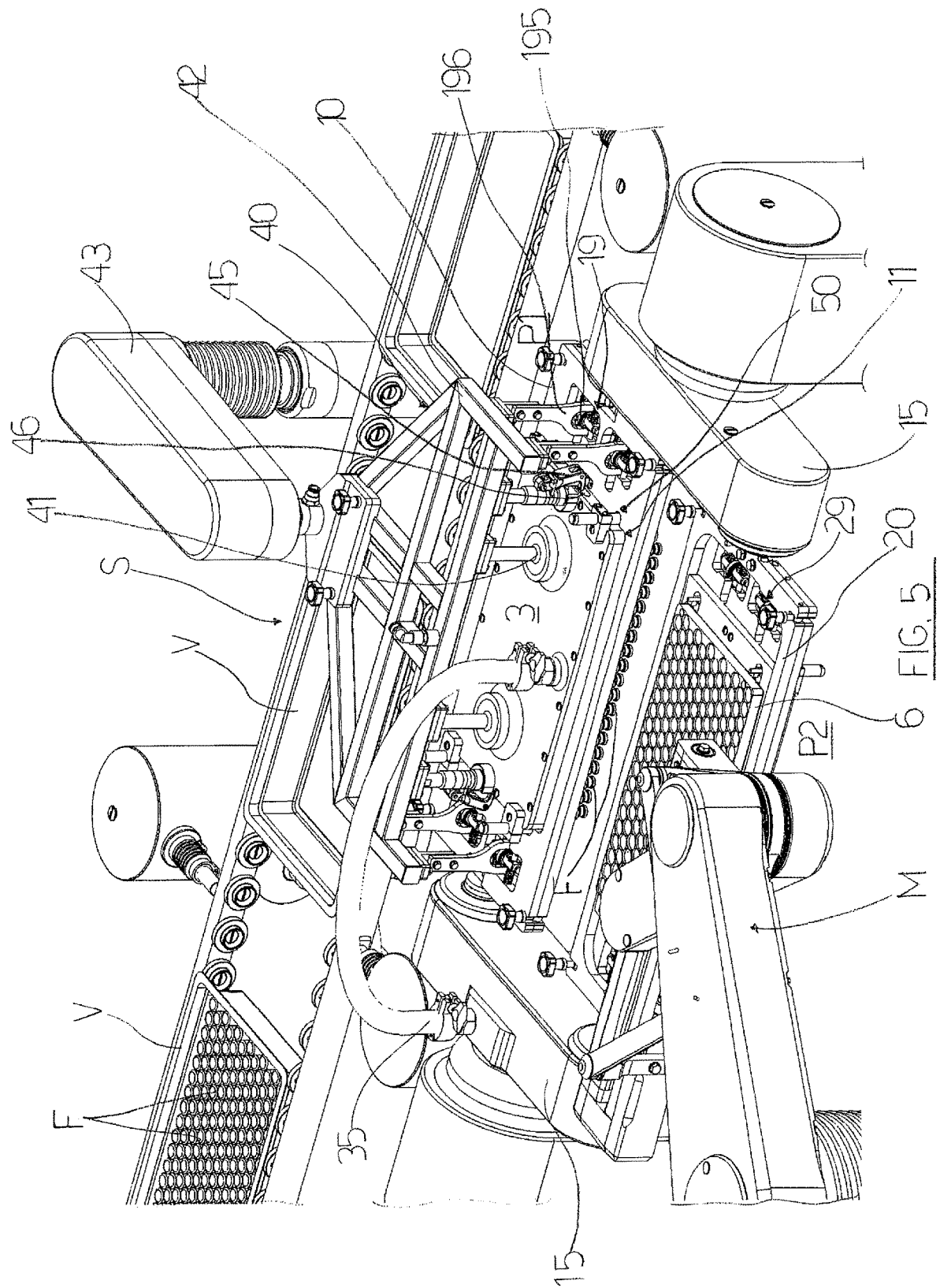

The frame (10), once the gripping and moving means (40) have positioned and released the suction plate (3) in the housing (11), and they have been distanced (see FIGS. 5 and 6), is activatable in rotation about the rotation axis (R1) (see FIG. 7) in such a way as to be positioned in the second operating position (P2), thus causing the suction plate (3) borne by the housing (11) to perform a rotation about the rotation axis (R1) so that the bottles (F) retained in the relative seats (31) are arranged with the relative mouths facing upwards when the frame (10) is in the second operating position (P2) (see FIG. 8).

Lastly, the handling organ (M) is predisposed and configured to grip, handle, move and release the bottles (F), so that when the frame (10) has been positioned in the second operating position (P2) with the relative housing (11) which bears the suction plate (3) with the bottles (F) in the relative seats (31) having the relative mouths facing upwards (situation illustrated in FIG. 8), the handling organ (M) can be activatable to grip a group of bottles (F) and extract the bottles (F) from the seats (31) of the suction plate (3), and repeat the above operations up to removing all the bottles (F) from the seats (31) of the suction plate (3) (see the sequence of FIGS. from 9 to 13).

In particular, the handling organ (M) is predisposed and configured to pick up groups of bottles (F) time by time from the seats (31) of the suction plate (3), for example a complete row of bottles (F), and to transfer the groups, keeping them always with the mouths thereof facing upwards, at a filling station (not illustrated in the figures as not being a part of the invention) predisposed to carry out the filling with a pharmaceutical product or substance.

Owing to the use of a suction plate (3) with suction seats (31) having a shape and dimension that are such as to be able to internally house a part of the body of the bottles, and arranged with an arrangement corresponding to that of the bottles internally of the trays, the apparatus (100) is able simply and efficiently to extract the bottles from the trays by the movement of the suction plate carried out with the gripping and moving means (40).

Further, owing to the frame (10) having a housing (11) that is such as to be able to receive, by form coupling, the suction plate (3) with the relative seats (31) which retain the bottles (F), the apparatus is able to contemporaneously carry out the tilting of all the bottles, and arrange them with the relative mouths facing upwards, simply by rotating the frame (10) about the rotation axis (R1).

In this way, the bottles, which are retained by suction, and therefore stable, in the suction seats of the suction plate positioned in the housing of the frame, can be contemporaneously all tilted without the need to have to use bottle gripping and moving means or organs which they would have had to pick up and move in order to tilt them, either single bottles or groups of bottles, and repeat these operations up to complete emptying of the tray.

Therefore, owing to the combined use of the frame, with the housing, and of the suction plate with the suction seats which retain by suction all the bottles extracted from the tray, it is possible to extract and obtain, at the same time, the tilting of all the bottles by the simple rotation of the frame, and thus of the plate contained in the relative housing, about a rotation axis, in order to bring the frame (10) from the first operating position (P1) to the second operating position (P2) in proximity of the handling organ (M).

Therefore, all the bottles (F) contained in the seats (31) of the suction plate (3) brought into the housing (11) of the frame (10) positioned in the second operating position (P2) in proximity of the handling organ (M) will all be arranged with the relative mouths facing upwards, thus enabling the handling organ (M) to pick up groups of bottles from the suction plate and transfer them to the filling station (not illustrated) in a rapid and efficient manner, without having to carry out any further orientation action of the bottles.

Other advantageous characteristics of the apparatus of the invention are set down in the following.

The frame (10) can be configured and predisposed in such a way that, in order to be movable from the first operating position (P1) to the second operating position (P2), it is activatable about the rotation axis (R1) according to a curved trajectory with a prefixed rotation direction so that the frame (10), and therefore the suction plate (3) with the relative seats (31) which retain the bottles (F) by suction, is first raised with respect to the advancement line (L) and then lowered, and at the same time tilted with respect to the rotation axis (R1), (situation illustrated in FIG. 7) in order to be positioned in the second operating position (P2) in proximity of the handling organ (M), so that when it is in second operating position (P2), the bottles (F) are arranged with the mouths thereof facing upwards (see FIG. 8).

Further, the frame (10) is configured and predisposed in such a way that, in order to be movable from the second operating position (P2) to the first operating position (P1), after the handling organ (M) has collected all the bottles (F) from the suction plate (3) borne by the housing (11) of the frame (10) positioned in the second operating position (P2), the frame (10) is activatable about the rotation axis (R1) also according to the prefixed rotation direction according to a curved trajectory so that the frame (10), and therefore the emptied suction plate (3), is first lowered and then raised, and at the same time tilted with respect to the rotation axis (R1) (situation illustrated in FIG. 14), in order to be positioned in the first operating position (P1) in proximity of the rest station (S) of the advancement line (L), (see FIG. 15 and FIG. 1).

Figure 2:
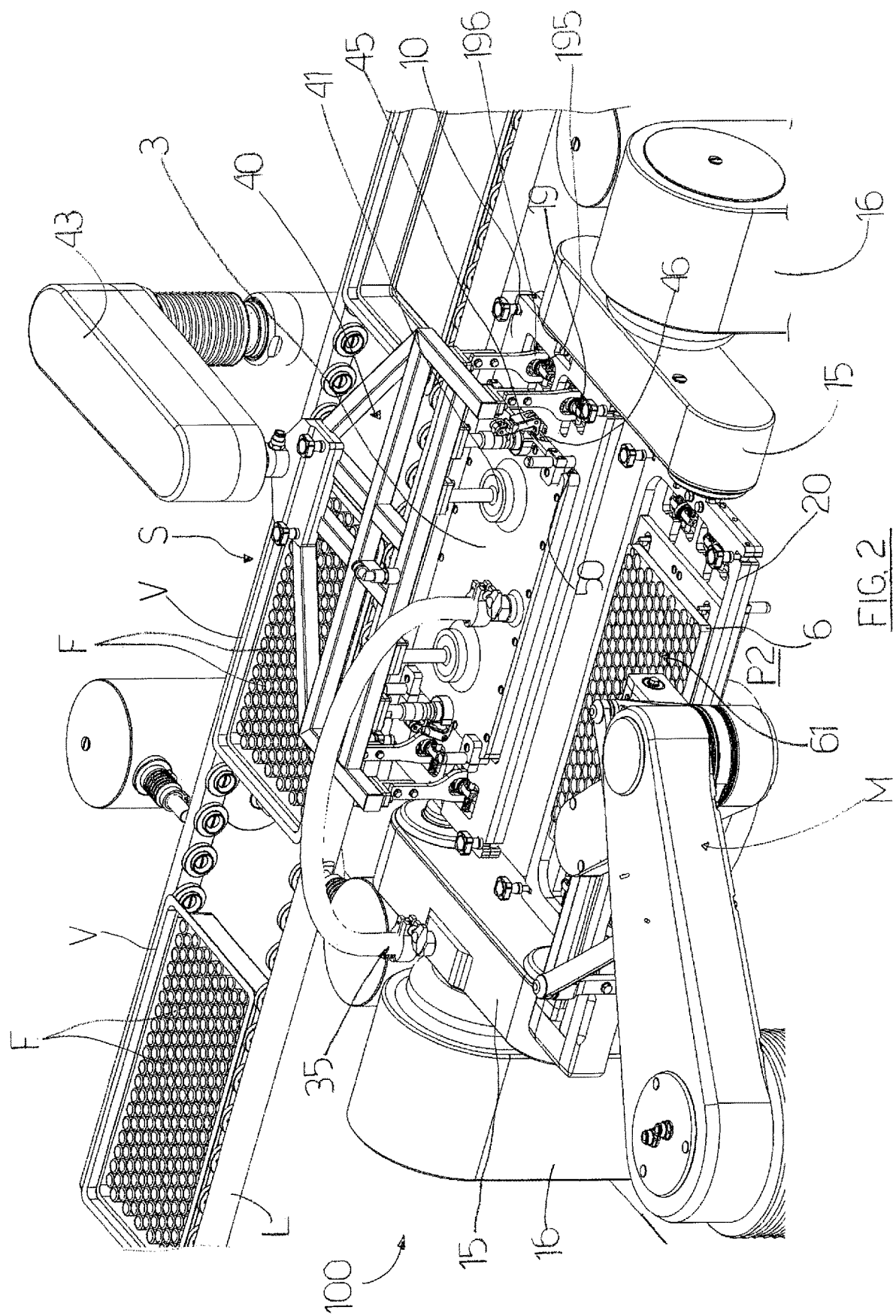

In this way, when the frame (10) with the emptied suction plate (3) retained in the relative housing (11) is returned into the first operating position (P1) (FIG. 15 and FIG. 1), the seats (31) of the suction plate (3) are facing downwards, and therefore the gripping and moving means (40), can be activated to collect the suction plate (3) (see FIG. 2) and, consequently to the release of the suction plate (3) by the releasable coupling means (19), raise the suction plate (3) and position the suction plate (3) above a new tray (V) containing bottles (F) (see FIG. 3) to be filled which in the meantime has been positioned in the rest station (S) by the advancement line (L).

The releasable coupling means (19) are advantageously configured to retain the suction plate (3) in the housing (11) of the frame (10) during the movement of the frame (10) from the first operating position (1) to the second operating position (P2), when the frame (10) is stationary in the second operating position (P2) and during the movement of the frame (10) from the second operating position (P2) to the first operating position (P1), and are further configured to release the suction plate (3) when the frame (10), with the suction plate (3) emptied of the bottles (F) is returned into the first operating position (P1), once the suction plate (3) has been collected by the gripping and moving means (40) and the gripping and moving means (40) raise the suction plate (3) from the housing (11).

In this way the coupling between the frame and the suction plate is always guaranteed, and only when the gripping and moving means (40) must grip the second suction plate and raise it from the second frame, do the second releasable coupling means (19) release the second suction plate (3) in order to enable the raising by the gripping and moving means (40).

According to the preferred embodiment illustrated in the figures (see for example FIG. 7), the releasable coupling means (19) can comprise cylindrical pins (190) predisposed in special niches (191) present in the frame (10) in proximity of the transversal edges of the housing (11), which cylindrical pins (190) are subjected to the action of pusher springs (192) which keep them pressed towards the housing (11) in such a way that, when the suction plate (3) is positioned in the housing (11), to be inserted in corresponding holes or slots (not illustrated in detail in the figures) present in the transversal edges of the suction plate (3).

The pusher springs (192) act on the cylindrical pins (190) by means of a spindle (194) which bears a disc (195).

The gripping and moving means (40) comprise deactivating means (196) of the pusher springs (192) which consist in fork elements (196) having a seat that is such as to accommodate the disc (195) internally thereof and having a shape that is such as to translate the disc (195) in an opposite direction to the action of the push of the pusher springs.

In this way, when the gripping and moving means (40) are lowered to pick up the suction plate (3) present in the housing (11) of the frame (10) (see for example FIG. 5), the fork elements (196) couple with the disc (195) and force it to translate in an opposite direction with respect to the thrust direction that the pusher springs exert on the cylindrical pins, thus causing the cylindrical pins to retract from the transversal edges of the frame (10), thus disengaging from the slots or holes of the suction plate (3), which will be decoupled from the frame (10).

Consequently, the gripping and moving means (40), can raise the second suction plate (3) from the second frame (10).

The same situation will be repeated in an identical way when the gripping and moving means (40) repositions the suction plate (3) in the housing (11) of the frame (10) once the bottles (F) have been picked up from the tray (V).

In the preferred embodiment illustrated in the figures, the apparatus (100) is such that the frame (10) is borne by a pair of arms (15), the pair of arms (15) being rotatably mounted on relative support elements (16) so that the pair of arms (15) is activatable in rotation with respect to the support elements (16) about the rotation axis (R1).

In this way, with the rotation of the pair of arms (15) with respect to the support elements (16), the frame (10) can be activated in rotation about the rotation axis (R1) and moved and tilted from the first operating position (P1) to the second operating position (P2) and vice versa.

In the preferred but not exclusive embodiment illustrated in the figures, the apparatus (100) is such that the gripping and moving means (40) comprise suction cup means (41), which are borne by a support structure (42) activatable and movable in space by means of a movable arm (43).

In particular, the gripping and moving means (40) further comprise hook gripping means (45) which are destined also to couple with coupling seats (46) present along the transversal edges of the second suction plate (3), with the aim of keeping the suction plate (3) as stable as possible during the movement from the tray to the housing of the frame once the bottles have been collected.

In order to facilitate the positioning of the suction plate (3) in the housing (11) of the frame (10), centring means (50) are present for centring the suction plate (3) in the housing (11) of the frame (10).

The centring means (50) can comprise special seats (51) realised along the transversal edges (or longitudinal edges) of the housing (11) destined to internally accommodate cylindrical elements (52) borne by the suction plate (3) at the relative transversal edges (or longitudinal edges), in positions such that when the suction plate (3) is lowered to be positioned in the housing (11) of the frame (10), the cylindrical elements (52) can be inserted and be accommodated in the seats (51).

A further particularly advantageous of the apparatus of the present invention is as follows.

As illustrated in the figures, the apparatus (100) is such that the pickup and transfer station (1) can also comprise a second suction plate (6) and a second frame (20).

In this case, the second suction plate (6) is provided on a relative face of a plurality of seats (61), each of which being conformed so as to be able to house internally thereof the bottom and a portion of the body of a bottle (F).

In a like way to the seats (31) of the suction plate (3), the plurality of seats (61) of the second suction plate (6) is predisposed on the face of the second suction plate (6) in an arrangement corresponding to the arrangement of the bottles (F) present in the trays (V), and each of the seats (61) is predisposed and configured to be connected to a suction source (65), so as to exert a suction action.

In turn, the second frame (20) is conformed in such a way as to have at least a through-housing (21) having a shape and dimensions such as to be able to receive the second suction plate (6), by form coupling.

In particular, the second frame (20) is configured and predisposed to be activatable in rotation about the rotation axis (R1) contemporaneously with the frame (10), so that when the frame (10) is positioned in the first operating position (P1), the second frame (20) is positioned in the second operating position (P2), and vice versa, when the frame (10) is positioned in the first operating position (P1), the second frame (20) is positioned in the second operating position (P2).

Second releasable coupling means (29) are also present, configured and predisposed to releasably retain the second suction plate (6) in the housing (21) of the second frame (20).

In this way, with this particular set-up of the apparatus with two frames and two suction plates, while the handling organ empties a suction plate borne by a relative frame stationary in the second operating position, and transfers the bottles to be filled to the filling station, it is possible with the other suction plate to extract bottles from another tray brought into the rest station by the advancement line and to transfer the other suction plate with the bottles into the housing of the other frame stationary in the first operating position.

In fact, with this detail of the apparatus, when the frame (10), with the relative housing (11) in which the suction plate (3) is positioned with the relative seats (31) containing the bottles (F), is positioned in the second operating position (P2) and the handling organ (M) is activated to collect the bottles (F), the second frame (20), with the relative housing (21) in which the second suction plate (6) is positioned in the first operating position (P1) (see FIG. 8).

In this way, the gripping and moving means (40) can be activatable to collect the second suction plate (6) and, consequently to the release of the second suction plate (6) by the second releasable coupling means (29), can raise and move the second suction plate (6).

The gripping and moving means (40) can thus position the second suction plate (6) above another tray (V) containing bottles (F) to be filled, in the meantime positioned by the advancement line (L) in the rest station (S), and can lower the second suction plate (6) towards the tray (V) so that the bottles (F) present therein are housed in the seats (61) of the second suction plate (6), so that the bottles (F) are retained by suction in the seats (61).

Lastly, the gripping and moving means (40) can be activatable to raise the second suction plate (6), with the bottles (F) retained by suction in the seats (61), and position the second suction plate (3) at the through-housing (21) of the second frame (20) so that the bottles (F), retained by suction in the seats (61), are turned with the mouths thereof facing downwards (sequence illustrated in FIGS. from 9 to 13).

Instead, when the frame (10), once the suction plate (3) borne by the relative housing (11) has been emptied of the bottles (F), is activated in rotation about the rotation axis (R1) to be newly positioned in the first operating position (P1), the second frame (20) is contemporaneously activated in rotation about the rotation axis (R1) in order to be positioned in the second operating position (P2), thus causing the second suction plate (6) borne by the relative housing (21) to perform a rotation about the rotation axis (R1) so that the bottles (F) retained in the relative seats (61) are arranged with the relative mouths facing upwards when the second frame (20) is in the second operating position (P2) (see FIGS. 14 and 15).

The handling organ (M) can be thus activatable to extract groups of bottles (F) from the second suction plate (6) up to emptying the second suction plate (6).

The second frame (20) is also advantageously borne by the pair of arms (15) mounted rotatably on the support elements (16), the pair of arms (15) being activatable in rotation with respect to the support elements (16) about the rotation axis (R1) so as to contemporaneously activate the frame (10) and the second frame (20) in rotation about the rotation axis (R1) and thus move the frame (10) from the first operating position (P1) to the second operating position (P2) and, at the same time, the second frame (20) from the second operating position (P2) to the first operating position (P1), and vice versa.

Figure 7:
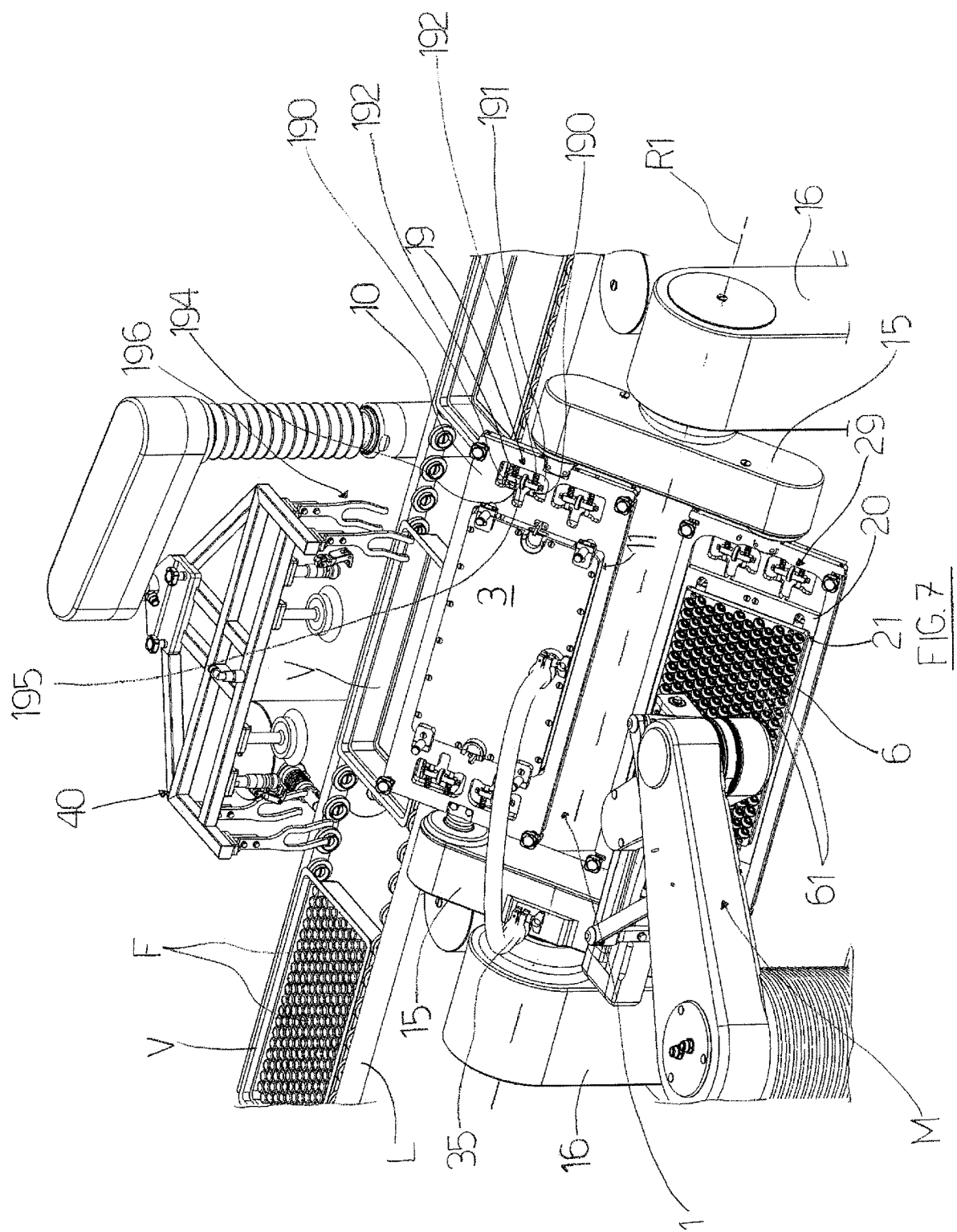

In particular, the second frame (20) is borne by the pair of arms (15) in such a way that when the frame (10) is activated in rotation about the rotation axis (R1) in order to be moved from the first operating position (P1) to the second operating position (P2) following a curved trajectory in the prefixed rotation direction in order to be first raised and then lowered, and contemporaneously tilted, with respect to the rotation axis (R1), the second frame (20) is activated in rotation about the rotation axis (R1) in order to be moved from the second operating position (P2) to the first operating position (P1) following a curved trajectory in the prefixed rotation direction in order that the second suction plate (61) is first lowered and then raised, and contemporaneously tilted, with respect to the rotation axis (R1) (see FIGS. 7 and 8).

Vice versa, when the frame (10) is activated in rotation about the rotation axis (R1) in order to be moved from the second operating position (P2) to the first operating position (P1) following a curved trajectory in the prefixed rotation direction so that the frame (10), and thus the suction plate (3) emptied of the bottles, is first lowered and then raised, and at the same time tilted with respect to the rotation axis (R1), in order to be positioned in the first operating position (P1) in proximity of the rest station (S) of the advancement line (L), the second frame (20) is activated in rotation about the rotation axis (R1) in order to be moved from the first operating position (P1) to the second operating position (P2) following a curved trajectory in the prefixed rotation direction so that the second frame (20), and therefore the second suction plate (6) containing the bottles (F) retained in the relative suction seats (61), is first lowered and then raised, and contemporaneously tilted, with respect to the rotation axis (R1), so that when it is in the second operating position (P2), the bottles (F) are arranged with the mouths thereof facing upwards (see FIGS. 14 and 15).

The second releasable coupling means (29), like the releasable coupling means (19) are configured to retain the second suction plate (6) in the housing (21) of the second frame (20) during the movement of the second frame (20) from the first operating position (P1) to the second operating position (P2), when the second frame (20) is stationary in the second operating position (P2) and during the movement of the second frame (20) from the second operating position (P2) to the first operating position (P1).

The second releasable coupling means (29) are further configured to release the second suction plate (6), when the second frame (20), with the second suction plate (6) emptied of the bottles (F), is returned into the first operating position (P1) and the gripping and moving means (40), once the second suction plate (6) has been collected, must raise the second suction plate (6) from the housing (21) of the second frame (20).

In this way, the coupling between the second frame (20) and the second suction plate (6) is always guaranteed, and only when the gripping and moving means (40) must grip the second suction plate (6) and raise it from the second frame (20), do the second releasable coupling means (29) release the second suction plate (6) in order to enable the raising by the gripping and moving means (40).

In the preferred embodiment illustrated in the figures (see for example FIG. 14), the second releasable coupling means (29) can comprise cylindrical pins (290) predisposed in special niches (291) present in the second frame (20) in proximity of the transversal edges of the housing (21), which cylindrical pins (290) are subjected to the action of pusher springs (292) which keep them pressed towards the housing (21) so as, when the second suction plate (6) is positioned in the housing (21), to be inserted in corresponding holes or slots (not illustrated in detail in the figures) present in the transversal edges of the second suction plate (6).

The pusher springs (292) act on the cylindrical pins (290) by means of a spindle (294) which bears a disc (295).

The seat of the above-mentioned fork elements (196) of the gripping and moving means (4) has a shape that is such as to accommodate internally thereof also the disc (295) of the second releasable coupling means (29) and such as to translate the disc (295) in an opposite direction to the pushing action of the pusher springs (292) once the seat couples with the disc (295).

In this way, when the gripping and moving means (40) are lowered to pick up the second suction plate (6) present in the housing (21) of the second frame (20) (see for example FIG. 12), the fork elements (196) couple with the disc (295) and force it to translate in an opposite direction with respect to the thrust direction that the pusher springs (292) exert on the cylindrical pins (290), thus causing the cylindrical pins (290) to retract from the transversal edges of the second frame (20), thus disengaging from the slots or holes of the second suction plate (6), which will be decoupled from the frame (20).

Consequently, the gripping and moving means (40), can raise the second suction plate (6) from the second frame (20).

The same situation will be repeated identically when the gripping and moving means (40) position the second suction plate (6) in the housing (21) of the second frame (20), once the bottles (F) have been picked up from the tray (V) (see FIG. 12).

To grip the second suction plate (6), as well as the suction cup means (41) which act directly on the second suction plate (6), the hook gripping means (45) of the gripping and moving means (40) are destined to couple with special coupling seats (47) present along the transversal edges of the second suction plate (6) (see for example FIG. 12).

Second centring means (70) are also present for centring the second suction plate (6) in the housing (21) of the second frame (20) (see for example FIGS. 9, 10 and 12).

The second centring means (70) can comprise special seats (71) realised along the transversal edges (or longitudinal edges) of the housing (21) of the second frame (20) destined to internally accommodate cylindrical elements (72) borne by the second suction plate (6) at the relative transversal edges (or longitudinal edges) at positions such that, when the second suction plate (6) is lowered to be positioned in the housing (21), the cylindrical elements (72) can insert and be accommodated in the seats (71).

The following is a possible operating sequence of the functioning of the apparatus of the invention, in the preferred embodiment illustrated in the figures with two frames and two suction plates, each of the two frames being provided with a relative housing having a shape and dimensions such as to be able to receive the corresponding suction plate, by form coupling.

The operating sequence will be described by taking the starting situation illustrated in FIG. 1 as reference, in which the advancement line (L) will have advanced, and halted in the rest station (S), a tray (V) containing bottles (F) to be filled which are arranged with the relative mouths facing towards the bottom of the tray (V).

Upstream, prior to being positioned on the advancement line (L), the trays (V) have been appropriately extracted from the packs (casings) thereof and the film covering them, for protecting the bottles, removed.

The frame (10) is in the first operating position (P1) and the suction plate (3) positioned in the housing (11) of the frame (10), the releasable coupling means (19) coupling with and constraining the suction plate (3) to the frame (10).

The second frame (20) is in the second operating position (P2) and the second suction plate (6) positioned in the housing (21) of the second frame (20), with the second releasable coupling means (29) coupling and constraining the second suction plate (6) and the second frame (20).

Figure 3:
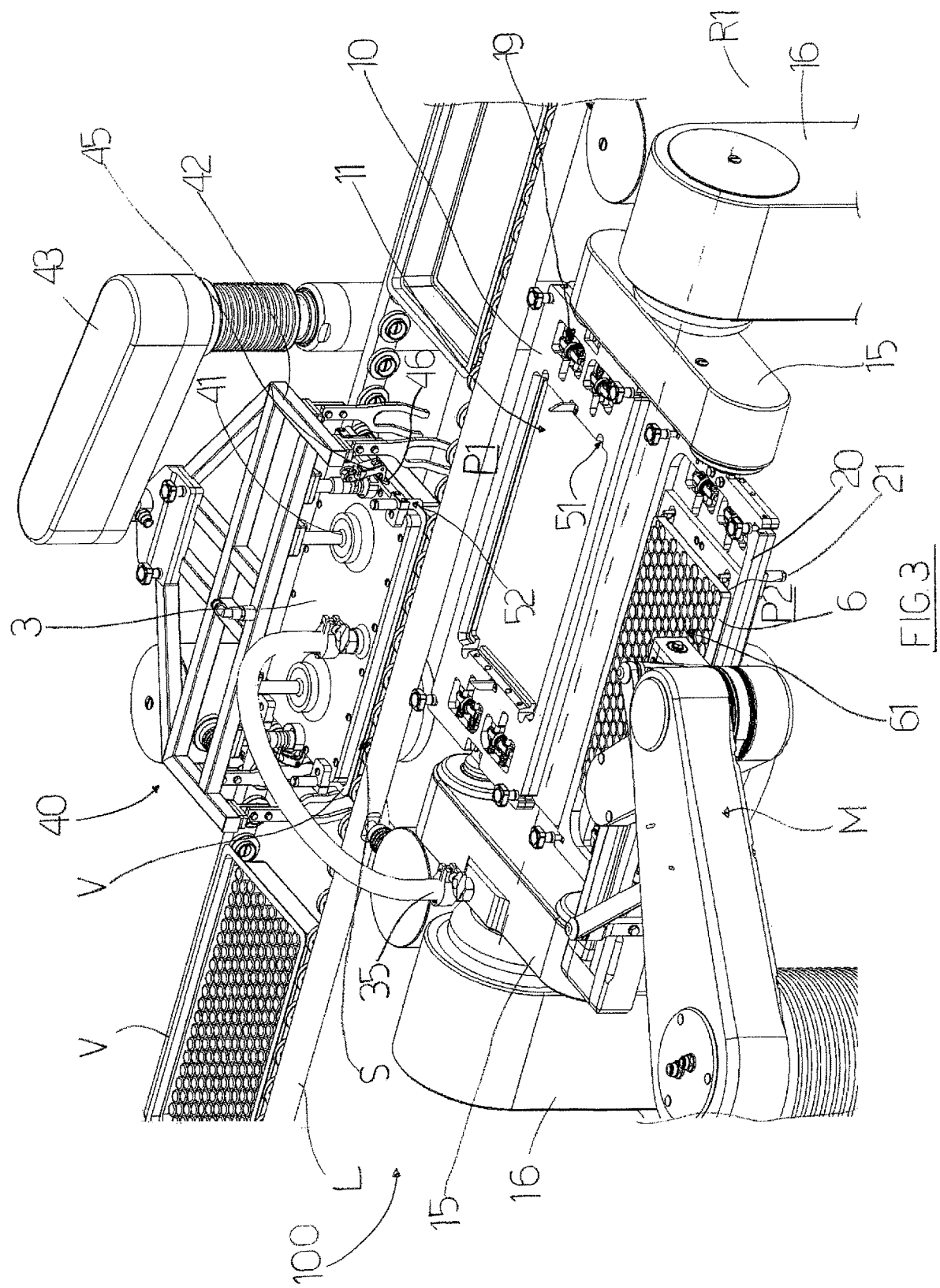

The gripping and moving means (40) are moved and activated in such a way as to pick up the second suction plate (3) from the housing (11) of the frame (10) (FIG. 2), transfer it to above the tray (V) in the rest station (S) and lower it towards the tray (V) so that the bottles (F) are inserted in the suction seats (31) of the suction plate (3) (FIG. 3).

When the gripping and moving means (40) are lowered to pick up the second suction plate (3) from the frame (10) (FIG. 2), the fork elements (196) couple with the discs (195) of the releasable coupling means (19), retracting them and thus causing the cylindrical pins (190) to retract which disengage and free it from the suction plate (3).

Figure 4:
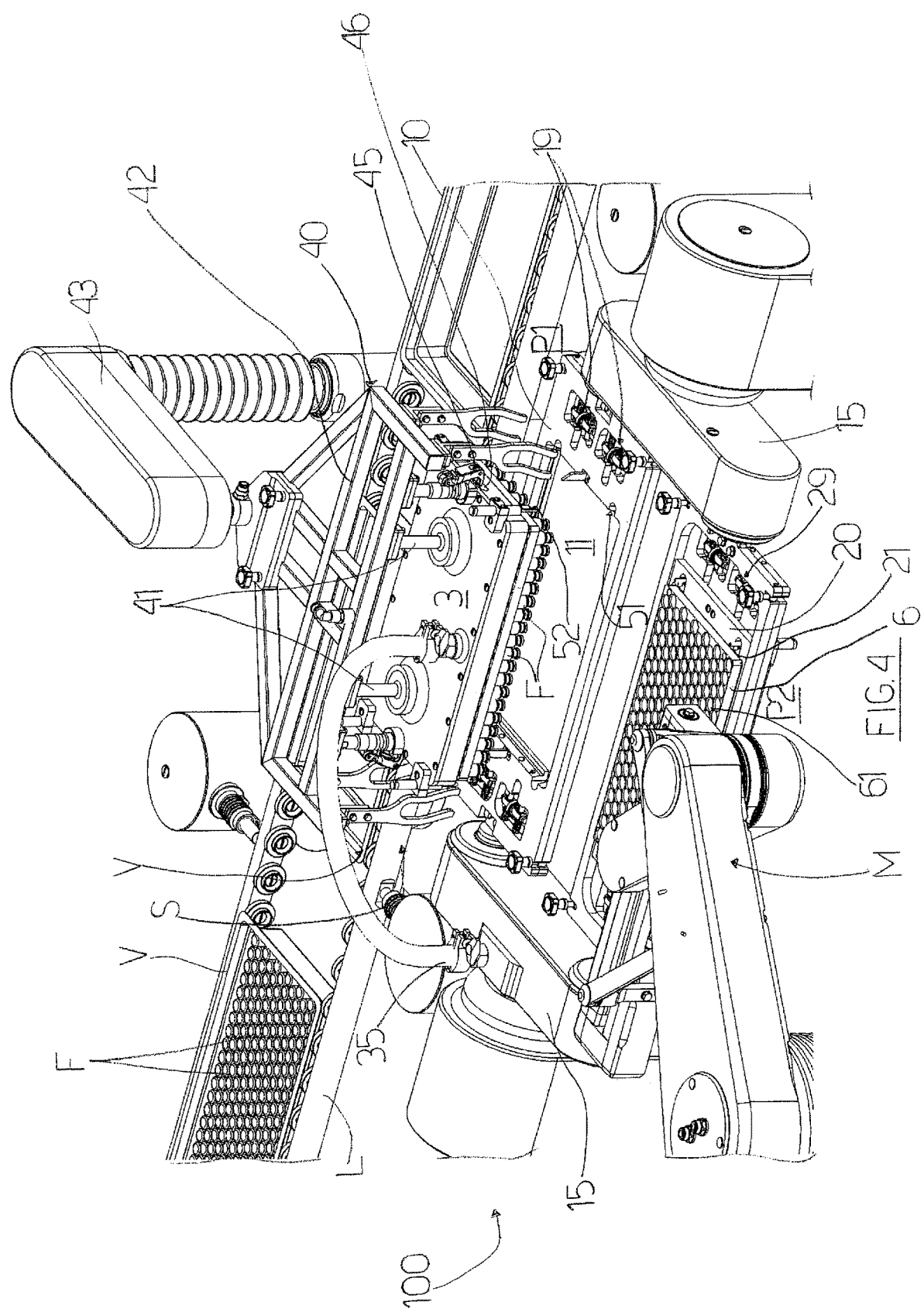
Figure 6:
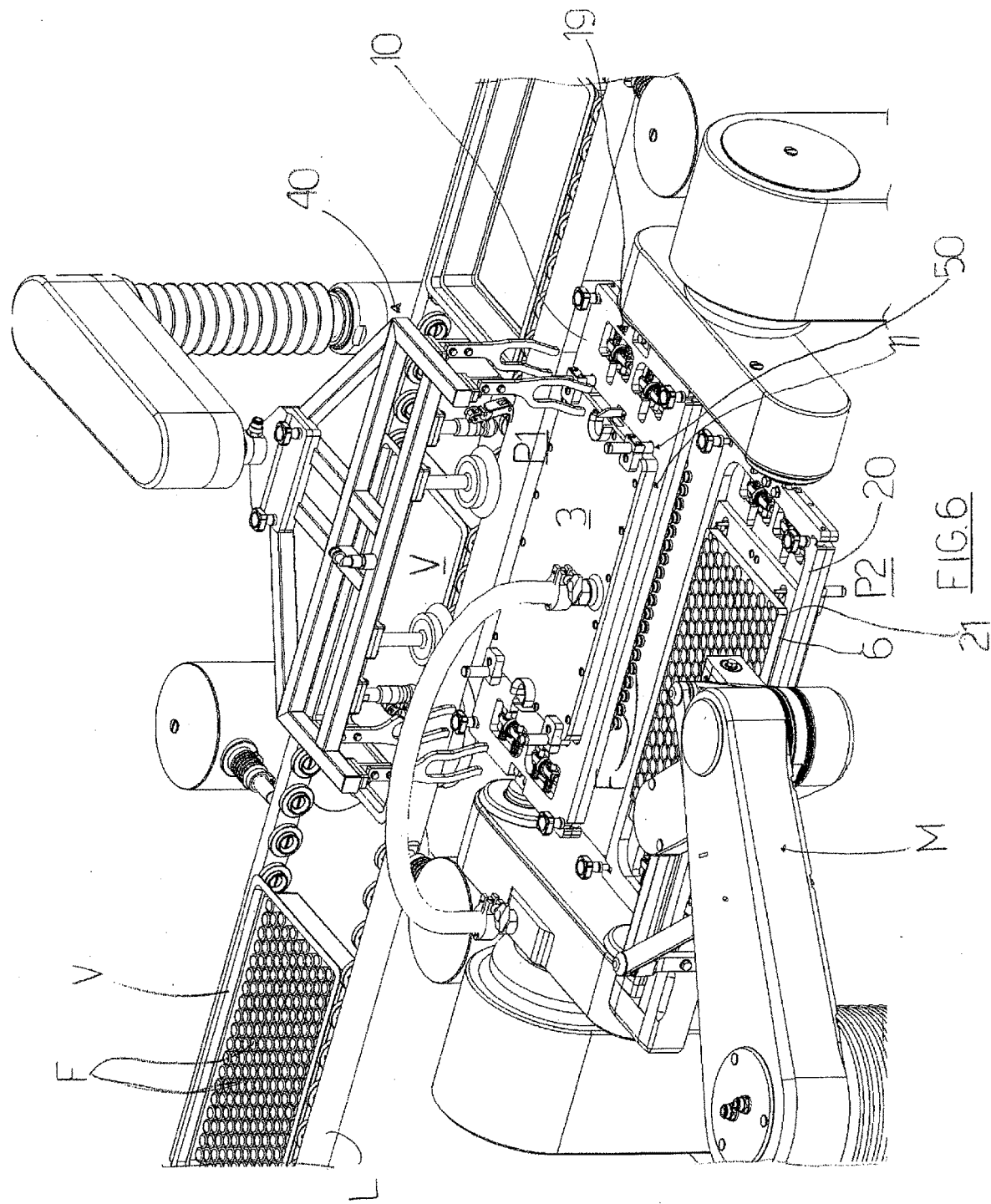

The gripping and moving means (40) raise and then transfer the suction plate (3) containing, in the relative seats (31), the bottles (F) extracted from the tray (V) (FIG. 4) and newly reposition the suction plate (3) in the housing (11) of the frame (10) still stationary in the first operating position (P1) (FIG. 5), then to release the suction plate (3) and move away (FIG. 6).

When the gripping and moving means (40) lower to reposition the suction plate (3) bearing the bottles (F) in the housing (11) of the frame (10), the fork elements (196) newly engage with the disc (195) thus causing the cylindrical pins (190) to retract and enabling the positioning of the suction plate (3) in the housing (11).

Thus, with the suction plate (3) repositioned in the housing (11) of the second frame (10) stationary in the first operating position (P1), the bottles (F) are retained by suction in the seats (31) of the second suction plate (3) and are arranged with the relative mouths facing downwards.

With the raising of the gripping and moving means (40) from the suction plate (3), the fork elements (196) disengage from the discs (195) and the cylindrical pins (190) can be pushed by the springs (192) to insert and couple with the slots/holes (not visible in the appended figures) present in the transversal edges of the suction plate (3), in order to block the suction plate (3) to the frame (10).

At this point the frame (10) and the second frame (20) are activated in rotation about the rotation axis (R1), so that the frame (10) is first raised and then lowered, and the second frame (20) first lowered and then raised, and at the same time tilted with respect to the rotation axis (R1) so as to be positioned respectively in the second operating position (P2) and in the first operating position (P1) (see FIG. 7 and also FIG. 8 where the frame (10) with the suction plate (3) that bears the bottles (F) in the relative seats (31) is positioned in the second operating position (P2) in proximity of the handling organ (M) while the second frame (20) with the second suction plate (6) and the relative empty seats (61) is in the first operating position (P1) in proximity of the rest station (S)).

The bottles (F) contained in the seats (31) of the suction plate (3) will thus be arranged with the relative mouths facing upwards, as the frame (10), by carrying out the rotation about the rotation axis (R1), has also be tilted with respect to the rotation axis (R1).

As mentioned in the foregoing, in order to perform these rotations and movements of the two frames, the pair of arms (15) is activated in rotation in a same predetermined rotation direction about the rotation axis (R1) with respect to the two support elements (16) to which they are rotatably constrained.

In the meantime the advancement line (L) will have advanced another tray (V) containing bottles (F) to be filled, and arranged with the mouths facing towards the bottom of the tray (V), at the rest station (S) (FIG. 9).

At this point, while the handling organ (M) starts to pick up groups of bottles (F) from the seats (31) of the suction plate (3) borne by the frame (10) stationary in the second operating position (P2), the gripping and moving means (40) can thus be activated to pick up the second suction plate (6) from the housing (21) of the second frame (20) stationary in the first operating position (P1) (FIG. 10), position it above the tray (V) in the rest station (S) and lower it towards the tray (V) so that the bottles (F) are received and retained by suction in the seats (61) of the second suction plate (6) (FIG. 11).

The gripping and moving means (40) can thus be activated to pick up the second suction plate (6) from the tray (V), so that the bottles (F) received and retained by the suction seats (61) of the second suction plate (6) are extracted from the tray, and are activated to position the second suction plate (6) newly in the housing (21) of the second frame (20), still stationary in the first operating position (P1) (FIG. 12) and are thus distanced (FIG. 13).

The bottles (F), retained by suction in the seats (61) of the second suction plate (6) will thus be arranged with the relative mouths facing downwards.

To raise and reposition the second suction plate (6) in the housing (21) of the second frame (2), the second releasable coupling means (29) will be deactivated/activated thanks to the coupling of the fork elements (196) with the relative discs (295) as described in the foregoing for the releasable coupling means (19).

Once the seats (31) of the suction plate (3) have been completely emptied by the handling organ (M) and the bottles (F) which were in them all transferred to the filling station, the frame (10) and the second frame (20) are activated in rotation about the rotation axis (R1), always in the same predetermined rotation direction and tilted with respect to the rotation axis (R1) (the pair of arms (15) is activated in rotation about the rotation axis (R1) with respect to the two support elements (16)) (see FIG. 14), until the frame (10), with the plate (3) emptied, is newly positioned in the first operating position (P1) and the second frame (20), with the second suction plate (6) having the relative suction seats (61) which retain the bottles (F) by suction, is positioned in the second operating position (P2) in proximity of the handling organ (M) (see FIG. 15).

The bottles (F) contained in the seats (61) of the second suction plate (6) will thus be arranged with the relative mouths facing upwards.

Having reached this situation, illustrated in FIG. 15, the handling organ (M) starts to pick up groups of bottles (F) from the seats (61) of the second suction plate (6) borne by the second frame (20) stationary in the second operating position (P2), while the gripping and moving means (40) can be activated to pick up the empty suction plate (3) from the housing (11) of the frame (10) stationary in the first operating position (P1), and to transfer and reposition the suction plate (3) above a new tray (V) with bottles (F) to be filled, which in the meantime has been positioned in the rest station (S), in order to pick up the bottles from the tray and repeat the above-described cycle.

The invention claimed is:

1. An apparatus for extracting pharmaceutical containers to be filled, the containers being bottles, from relative support elements constituted by a tray, wherein the bottles are arranged in the tray with the relative mouths for insertion of a pharmaceutical substance or product facing towards the bottom of the tray, the apparatus comprising:
   an advancement line, for advancing the trays, with the bottles inside, and for stopping the trays at a rest station;
   a handling organ;
   a pickup and transfer station, for picking up the bottles from the tray positioned by the advancement line in the rest station,
   wherein the pickup and transfer station comprises:
   a suction plate, provided on a relative face of a plurality of seats, each of which being conformed so as to be able to house internally thereof the bottom and a portion of the body of a bottle, the plurality of seats being predisposed on the face of the suction plate in an arrangement corresponding to the arrangement of the bottles present in the trays, and each of the seats being predisposed and configured to be connected to a suction source, so as to exert a suction action,
   a frame conformed in such a way as to have at least a through-housing having a shape and dimensions such as to be able to receive the suction plate, by form coupling, the frame being predisposed in such a way as to be activatable in rotation about a first rotation axis in order to be positionable in a first operating position, in proximity of the rest station of the advancement line, and in a second operating position in proximity of the handling organ;
   gripping and moving means of the suction plate, configured and predisposed to pick up and move the suction plate, the gripping and moving means being activatable, when a tray is positioned in the rest station of the advancement line and the frame is positioned in the first operating position, so as to collect and move the suction plate so as to position the suction plate above the tray and lower the suction plate towards the tray so that the bottles present therein are housed in the seats of the suction plate, in such a way that the bottles are retained by suction in the seats, and then to raise the suction plate, with the bottles retained by suction in the seats and position the suction plate at the through-housing of the frame so that the bottles, retained by suction in the seats, are turned with the mouths thereof facing downwards, releasable coupling means, configured and predisposed to releasably retain the suction plate once positioned in the housing, with the frame, once the gripping and moving means have positioned and released the suction plate in the housing, being activatable in rotation about the rotation axis in such a way as to be positioned in the second operating position, thus causing the suction plate borne by the housing to perform a rotation about the rotation axis so that the bottles retained in the relative seats are arranged with the relative mouths facing upwards when the frame is in the second operating position, and wherein the handling organ is predisposed and configured to grip, handle, move and release the bottles, so that when the frame has been positioned in the second operating position with the relative housing which bears the suction plate with the bottles in the relative seats, the handling organ can be activatable to grip a group of bottles and extract the bottles from the seats of the suction plate, and repeat the above operations up to removing all the bottles from the seats of the suction plate.

2. The apparatus as claimed in claim 1, wherein the frame is configured and predisposed in such a way that, in order to be movable from the first operating position to the second operating position, the frame is activatable about the rotation axis according to a curved trajectory with a prefixed rotation direction so that the frame, and therefore the suction plate with the relative seats which retain the bottles by suction, is first raised with respect to the advancement line and then lowered, and at the same time tilted with respect to the rotation axis, in order to be positioned in the second operating position in proximity of the handling organ, so that when the frame is in second operating position, the bottles are arranged with the mouths thereof facing upwards.

3. The apparatus as claimed in claim 2, wherein the frame is configured and predisposed in such a way that, in order to be movable from the second operating position to the first operating position, after the handling organ has collected all the bottles from the suction plate borne by the housing of the frame positioned in the second operating position, the frame is activatable about the rotation axis also according to the prefixed rotation direction according to a curved trajectory so that the frame, and therefore the emptied suction plate, is first lowered and then raised, and at the same time tilted with respect to the rotation axis, in order to be positioned in the first operating position in proximity of the rest station of the advancement line, so that the gripping and moving means, when the frame with the emptied suction plate retained in the relative housing is returned into the first operating position, can be activated to collect the suction plate and, consequently to the release of the suction plate by the releasable coupling means, raise the suction plate and position the suction plate above a new tray containing bottles to be filled which in the meantime has been positioned in the rest station by the advancement line.

4. The apparatus as claimed in claim 3, wherein the releasable coupling means are configured to retain the suction plate in the housing of the frame during the movement of the frame from the first operating position to the second operating position, when the frame is stationary in the second operating position and during the movement of the frame from the second operating position to the first operating position, and are further configured to release the suction plate when the frame, with the suction plate emptied of the bottles is returned into the first operating position, once the suction plate has been collected by the gripping and moving means and the gripping and moving means raise the suction plate from the housing.

5. The apparatus as claimed in claim 1, wherein the frame is borne by a pair of arms, the pair of arms being rotatably mounted on relative support elements so that the pair of arms is activatable in rotation with respect to the support elements about the rotation axis so that, with the rotation of the pair of arms with respect to the support elements, the frame can be activated in rotation about the rotation axis and moved and tilted from the first operating position to the second operating position and vice versa.

6. The apparatus as claimed in claim 1, wherein the gripping and moving means comprise suction cup means, which are borne by a support structure activatable and movable in space by means of a movable arm.

7. The apparatus as claimed in claim 6, wherein the gripping and moving means further comprise hook gripping means configured to couple with coupling seats present along the transversal edges of the suction plate.

8. The apparatus as claimed in claim 1, further comprising centering means for centering the suction plate in the housing of the frame.

9. The apparatus as claimed in claim 1, wherein the pickup and transfer station comprises:

a second suction plate, provided on a relative face of a plurality of seats, each of which being conformed so as to be able to house internally thereof the bottom and a portion of the body of a bottle, the plurality of seats being predisposed on the face of the second suction plate in an arrangement corresponding to the arrangement of the bottles present in the trays, and each of the seats being predisposed and configured to be connected to a suction source, so as to exert a suction action;

a second frame conformed in such a way as to have at least a through-housing having a shape and dimensions such as to be able to receive the second suction plate, by form coupling, the second frame being configured and predisposed to be activatable in rotation about the rotation axis contemporaneously with the frame, so that when the frame is positioned in the first operating position, the second frame is positioned in the second operating position, and vice versa, when the frame is positioned in the first operating position, the second frame is positioned in the second operating position, second releasable coupling means, configured and predisposed to releasably retain the second suction plate in the housing of the second frame, so that:

when the frame, with the relative housing in which the suction plate is positioned with relative seats containing the bottles, is positioned in the second operating position and the handling organ is activated to collect the bottles, the second frame, with the relative housing in which the second suction plate is positioned in the first operating position so that the gripping and moving means can be activatable to collect the second suction plate and, consequently to the release of the second suction plate by the second releasable coupling means, can raise and move the second suction plate so as to position the second suction plate above another tray containing bottles to be filled, in the meantime positioned by the advancement line in the rest station, and can lower the second suction plate (6) towards the tray so that the bottles present therein are housed in the seats of the second suction plate, so that the bottles are retained by suction in the seats, and then activatable to raise the second suction plate, with the bottles retained by suction in the seats, and position the second suction plate at the through-housing) of the second frame so that the bottles, retained by suction in the seats, are turned with the mouths thereof facing downwards;

and when the frame, once the suction plate borne by the relative housing has been emptied of the bottles, is activated in rotation about the rotation axis to be newly positioned in the first operating position, the second frame is contemporaneously activated about the rotation axis in order to be positioned in the second operating position, thus causing the second suction plate borne by the relative housing to perform a rotation about the rotation axis so that the bottles retained in the relative seats are arranged with the relative mouths facing upwards when the second frame in the second operating position, the handling organ being thus activatable to extract groups of bottles from the second suction plate up to emptying the second suction plate.

10. The apparatus as claimed in claim 9, wherein the second frame is also borne by a pair of arms mounted rotatably on support elements, the pair of arms being activatable in rotation with respect to the support elements about the rotation axis so as to contemporaneously activate the frame and the second frame in rotation about the rotation axis and thus move the frame from the first operating position to the second operating position and, at the same time, the second frame from the second operating position to the first operating position, and vice versa.

11. The apparatus as claimed in claim 10, wherein the second frame is borne by the pair of arms in such a way that when the frame is activated in rotation about the rotation axis in order to be moved from the first operating position to the second operating position following a curved trajectory in the prefixed rotation direction in order to be first raised and then lowered, and contemporaneously tilted, with respect to the rotation axis, the second frame is activated in rotation about the rotation axis in order to be moved from the second operating position to the first operating position following a curved trajectory in the prefixed rotation direction in order that the second frame, and therefore the second suction plate is first lowered and then raised, and contemporaneously tilted, with respect to the rotation axis, and vice versa, when the frame is activated in rotation about the rotation axis in order to be moved from the second operating position to the first operating position following a curved trajectory in the prefixed rotation direction so that the frame, and thus the suction plate emptied of the bottles, is first lowered and then raised, and at the same time tilted with respect to the rotation axis, in order to be positioned in the first operating position in proximity of the rest station of the advancement line, the second frame is activated in rotation about the rotation axis in order to be moved from the first operating position to the second operating position following a curved trajectory in the prefixed rotation direction so that the second frame, and therefore the second suction plate containing the bottles retained in the relative suction seats, is first lowered and then raised, and contemporaneously tilted, with respect to the rotation axis, so that when it is in second operating position, the bottles are arranged with the mouths thereof facing upwards.

12. The apparatus as claimed in claim 9, wherein the second releasable coupling means are configured both to retain the second suction plate in the housing of the second frame during the movement of the frame from the first operating position to the second operating position, when the second frame is stationary in the second operating position and during the movement of the second frame from the second operating position to the first operating position, and to release the second suction plate, when the second frame, with the second suction plate emptied of the bottles, is returned into the first operating position and the gripping and moving means, once the second suction plate has been collected, must raise the second suction plate from the housing of the second frame.

13. The apparatus as claimed in claim 9, wherein hook gripping means of the gripping and moving means are configured also to couple with coupling seats present along the transversal edges of the second suction plate.

14. The apparatus as claimed claim 9, further comprising second centering means for centering the second suction plate in the housing of the second frame.

* * * * *